US012689409B2

(12) United States Patent (10) Patent No.: US 12,689,409 B2

Levionnais et al. (45) Date of Patent: Jul. 21, 2026

(54) METHOD AND DEVICE FOR ADAPTING A NEAR-FIELD COMMUNICATION

(71) Applicant: ORANGE, Issy-les-Moulineaux (FR)

(72) Inventors: Philippe Michel Levionnais, Chatillon Cedex (FR); Olivier Lepetit, Chatillon Cedex (FR)

(73) Assignee: ORANGE, Issy-les-Moulineaux (FR)

( * ) Notice: Subject to any disclaimer, the term of this patent is extended or adjusted under 35 U.S.C. 154(b) by 332 days.

(21) Appl. No.: 18/262,654

(22) PCT Filed: Dec. 20, 2021

(86) PCT No.: PCT/FR2021/052403
§ 371 (c)(1),
(2) Date: Jul. 24, 2023

(87) PCT Pub. No.: WO2022/162289
PCT Pub. Date: Aug. 4, 2022

(65) Prior Publication Data
US 2024/0080065 A1 Mar. 7, 2024

(30) Foreign Application Priority Data

Jan. 26, 2021 (FR) ...................................... 2100730

(51) Int. Cl.
H04B 5/00 (2024.01)
H04B 5/22 (2024.01)
(Continued)

(52) U.S. Cl.
CPC ................. H04B 5/22 (2024.01); H04B 5/70 (2024.01); H04B 5/24 (2024.01); H04B 5/45 (2024.01)

(58) Field of Classification Search
None
See application file for complete search history.

(56) References Cited

U.S. PATENT DOCUMENTS 9,692,525 B2 * 6/2017 Konanur .............. H04B 13/005
9,913,077 B2 * 3/2018 Klabunde ............ H04B 13/005
(Continued)

FOREIGN PATENT DOCUMENTS

WO 2017093639 A1 6/2017

OTHER PUBLICATIONS

English translation of the Written Opinion of the International Searching Authority dated May 9, 2022 for corresponding International Application No. PCT/FR2021/052403, filed Dec. 20, 2021.
(Continued)

*Primary Examiner* — Tuan A Tran
(74) *Attorney, Agent, or Firm* — David D. Brush; Westman, Champlin & Koehler, P.A.

(57) ABSTRACT

A method and device for adapting a communication from a mobile terminal equipped with a near-field communication module. The mobile terminal is able to be placed in NFC mode or in IBC mode to carry out contactless transactions. It is able to receive a message in an electromagnetic field over a near-field channel. The method includes, on the mobile terminal, the following steps: receiving, from a terminal placed in read mode, called the reader terminal, a message inviting to open communications according to a type of near-field communication; detecting a type of near-field communication in the received invitation message; if the type of communication indicates an IBC communication, and the mobile terminal is placed in IBC mode, sending a pairing request over a return channel distinct from the near-field channel.

14 Claims, 4 Drawing Sheets

(51) Int. Cl.
  H04B 5/70       (2024.01)
  H04B 13/00      (2006.01)
  H04B 5/24         (2024.01)
  H04B 5/45         (2024.01)

(56)           References Cited

U.S. PATENT DOCUMENTS

| | | | | |
|---|---|---|---|---|
| 10,009,071 | B2 * | 6/2018 | Tanaka | H04B 5/26 |
| 10,321,406 | B2 * | 6/2019 | Bostick | H04B 13/005 |
| 10,693,526 | B2 * | 6/2020 | Levionnais | H04B 5/45 |
| 10,833,777 | B2 * | 11/2020 | Levionnais | H04W 4/20 |
| 11,159,509 | B2 * | 10/2021 | Araújo | H04L 63/0861 |
| 11,683,073 | B2 * | 6/2023 | Kletsov | H04B 5/77 |
| | | | | 375/256 |
| 2009/0233548 | A1 * | 9/2009 | Andersson | H04B 13/005 |
| | | | | 455/557 |
| 2014/0213184 | A1 * | 7/2014 | Matsubara | H04B 5/26 |
| | | | | 455/41.1 |

| | | | | |
|---|---|---|---|---|
| 2015/0189463 | A1 | 7/2015 | Klabunde et al. | |
| 2016/0294486 | A1 * | 10/2016 | Bolin | H04L 5/0048 |
| 2016/0380703 | A1 * | 12/2016 | Konanur | G06K 19/0723 |
| | | | | 235/492 |
| 2018/0242254 | A1 * | 8/2018 | Bostick | H04W 52/0251 |
| 2018/0351604 | A1 | 12/2018 | Levionnais et al. | |

OTHER PUBLICATIONS

International Standard, "Identification cards—Contactless integrated circuit(s) cards—Proximity cards—Part 3: Initialization and anticollision," ISO/IEC 14443-3:2001(E), First edition, Feb. 1, 2001.

International Search Report dated May 9, 2022 for corresponding International Application No. PCT/FR2021/052403, filed Dec. 20, 2021.

Written Opinion of the International Searching Authority dated May 9, 2022 for corresponding International Application No. PCT/FR2021/052403, filed Dec. 20, 2021.

* cited by examiner

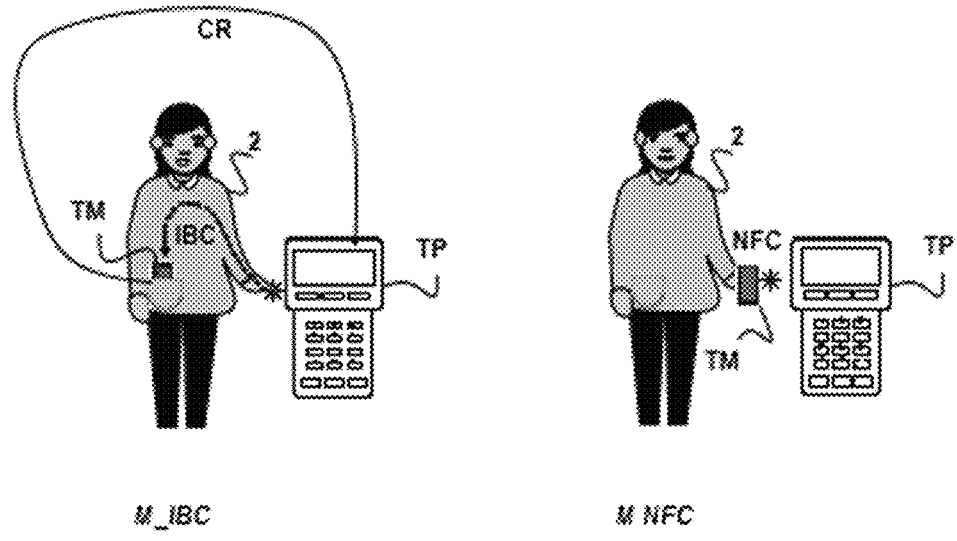
M_IBC                    M NFC
FIGURE 1
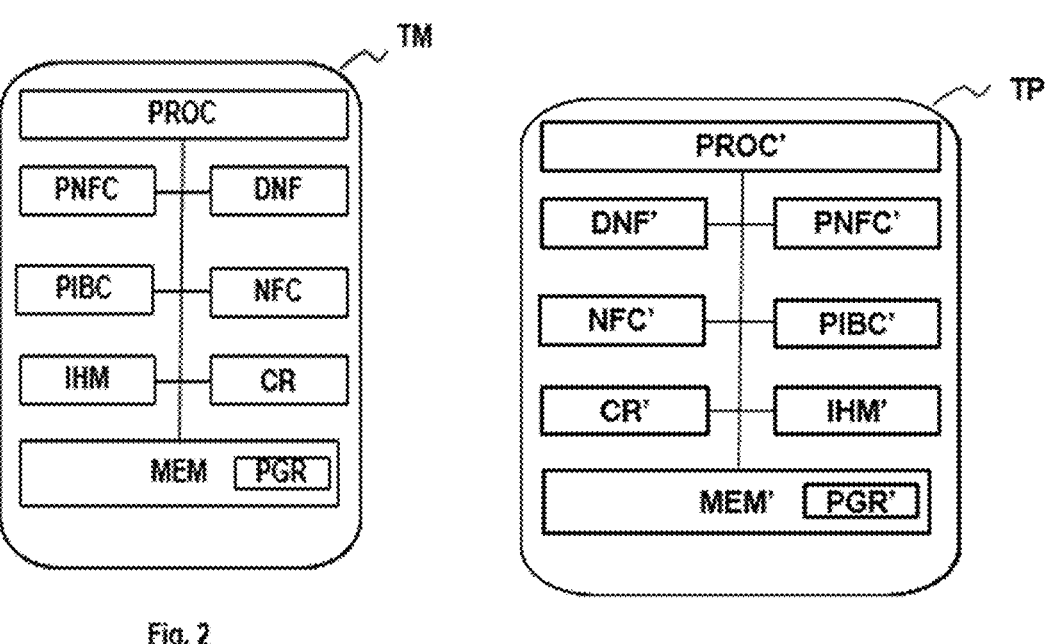
Fig. 2                    Fig. 3

WUPB/REQB

| SOF | APF | AFI | PARAM | CRC_B | EOF |
|-----|-----|-----|-------|-------|-----|

WUP_IBC (1)

| SOF | DATA1 | DATA2 | DATA3 | ... | CRC_IBC | EOF |
|-----|-------|-------|-------|-----|---------|-----|

WUP_IBC (2)

| SOF | APF | AFI | DATA1 | ... | CRC_IBC | EOF |
|-----|-----|-----|-------|-----|---------|-----|

| 0x0 | Type |
|-----|------|

METHOD AND DEVICE FOR ADAPTING A NEAR-FIELD COMMUNICATION

CROSS-REFERENCE TO RELATED APPLICATIONS

This application is a Section 371 National Stage Application of International Application No. PCT/FR2021/052403, filed Dec. 20, 2021, which is incorporated by reference in its entirety and published as WO 2022/162289 A1, on Aug. 4, 2022, not in English.

FIELD OF THE INVENTION

The invention generally relates to telecommunications, and more specifically to contactless communications using short-distance radio technologies, notably of the NFC (Near-Field Communication) type. It more specifically applies to terminals equipped with physical and software resources including a microprocessor and a Near-Field (NF) communication module receiving an electromagnetic field.

PRIOR ART

Near-field communications, usually called NFC, that are mainly based on ISO (International Standard Organization) standard 14443, use wireless technologies to allow information to be exchanged between two peripherals separated by a short distance, typically of less than ten centimeters. Communications of this type can be applied in many ways in the fields of payment or transport, for example.

Recently, new wireless communication techniques have emerged in this field using the human body as a channel. In these technologies, which are consolidated under the generic term of IBC (Intra-Body Communication) or even BCC (Body Channel Communication), the human body also acts as a conductor for transmitting information from one point to another. Therefore, the IBC terminal of its counterpart no longer needs to be approached in order to establish a communication: it can be kept in a pocket, in a bag, etc., of the carrier. By bringing a hand close to an NFC reader terminal, the individual carrying the IBC terminal establishes a secure communication between their terminal and the reader terminal. Document WO 2017/093639 describes such a system, for example.

However, the carrier may have to carry out NFC or IBC communications using the same mobile terminal.

Therefore, a requirement exists for ensuring compatibility of the NFC and IBC modes on the same terminal.

DISCLOSURE OF THE INVENTION

The invention aims to improve the prior art.

To this end, it proposes a method for adapting the communication of a mobile terminal equipped with a near-field communication module, said mobile terminal being able to be set to an NFC mode or to an IBC mode in order to carry out contactless transactions, and to receive a message in an electromagnetic field over a near-field channel, the method being characterized in that it comprises the following steps on the mobile terminal:

receiving, from a terminal, called reader terminal, set to reader mode, a message inviting communications according to a type of near-field communication;

detecting a type of near-field communication in the received invitation message;

transmitting, if said type of communication indicates an IBC communication, and the mobile terminal is set to IBC mode, a pairing request over a return channel distinct from the near-field channel.

Advantageously, according to the invention, a specific protocol is set up between the reader terminal and the IBC/NFC mobile terminal to initialize a communication according to either mode. Indeed, a mobile terminal can be capable of operating in both modes. It is therefore important to add an IBC functionality to the mobile terminal, yet without disrupting the standard NFC communications. By receiving an IBC type communication request, the mobile terminal will establish the software and hardware actions needed to allow the transaction via a return channel, whereas when receiving an NFC communication request, it will establish a standard NFC communication, according to the prior art.

The term "mobile terminal" is understood to mean a mobile terminal equipped with an NFC module. This can be, for example, a mobile telephone, or smartphone, or even a connected object.

The term "reader terminal" is understood to mean a terminal equipped with an NFC module able to be set to reader mode as defined by the NFC standards. It can be, for example, an EPT (Electronic Payment Terminal). In reader mode, the terminal uses its own RF field to communicate. It is said to be active. On the contrary, in card emulation mode, the terminal responds to a command from the initiator/reader in a passive mode using a load modulation.

The term "near-field communication module" is understood to mean a controller, or NFC component (CLF, ContactLess Frontend) forming a near-field communication module like an electromagnetic transponder and comprising software components (firmware, etc.) required for implementing NFC communications. Such a component is associated with an antenna, which transmits the received NF signals to the NFC component.

The term "IBC", or IBC mode, is understood to mean a near-field communication passing through the body of the user. The term is used in contrast to "NFC" mode, which corresponds to the standard mode of an NFC communication, in which the terminal that comprises the NFC device (conventionally, a mobile terminal, or smartphone) is in the physical proximity of the NFC reader terminal (for example, a payment terminal).

The term "type of near-field communication" is understood to mean a standard NFC or IBC type communication, i.e., a communication established in the near-field.

According to a particular embodiment of the invention, the method as described above further comprises a step of:

transmitting a command to switch to IBC mode to the near-field communication module.

Advantageously, according to this embodiment, the mobile terminal commands the NFC component of the mobile terminal so that it is set to the correct mode; indeed, an IBC type message can be received in an NFC hardware mode, but the message will be of poor quality if no adaptation has been carried out. Such an adaptation notably can be carried out on the antenna of the NFC circuit by a software or hardware adaptation.

According to another particular embodiment of the invention, which can be implemented cumulatively or alternatively with the previous embodiment, the method as described above is further characterized in that transmitting a pairing request over a return channel is followed by a step of:

establishing a two-way communication with the reader terminal over the return channel.

Advantageously, according to this embodiment, with the return channel being distinct from the NFC channel, a greater amount of data can be exchanged. Moreover, the fact that the NFC channel is no longer used allows the carrier of the mobile terminal to move away from the reader terminal.

According to another particular embodiment of the invention, which can be implemented cumulatively or alternatively with the previous embodiments, the method is characterized in that said invitation message contains a random datum for establishing the return channel.

Advantageously, according to this embodiment, the random datum can be used to enhance security when establishing the return channel: if the same random datum is shared by the mobile terminal and by the reader terminal, the communication can be carried out. The random datum, also called "challenge", assumes the form of a parameter allowing basic computation of secret cryptographic keys, the result of which is compared by the two entities before establishing the communication.

According to another particular embodiment of the invention, which can be implemented cumulatively or alternatively with the previous embodiments, the method is characterized in that said invitation message contains a type of IBC application.

Advantageously, according to this embodiment, the type of IBC application can be conveyed in the invitation message. This allows a certain number of different transactions to be defined for the IBC (transport, payment, game, data transfer, etc.).

According to another particular embodiment of the invention, which can be implemented cumulatively or alternatively with the previous embodiments, the method is characterized in that said invitation message is received during an ISO 14443 type communication.

Advantageously, according to this embodiment, an existing standard that is adhered to by all the electronic smart cards on the market is reused. During an ISO 14443-3 type communication, messages stipulated by the standard are exchanged between the reader terminal and the card on the near-field channel. If the new invitation message complies with this message format (in terms of frequency, coding modes, types of frames, etc.), the compatibility can be best assured.

According to another particular embodiment of the invention, which can be implemented cumulatively or alternatively with the previous embodiments, the method is characterized in that the type of IBC communication is indicated in a field of the message left empty by the NFC standard for a future use.

Advantageously, according to this embodiment, an existing NFC standard is reused by using a field that is left empty, which therefore does not disrupt the operation of a receiver that would only be of the NFC type.

According to another particular embodiment of the invention, which can be implemented cumulatively or alternatively with the previous embodiments, the method is characterized in that the type of IBC communication is indicated in a field of the message defined by the standard for a proprietary application.

Advantageously, according to this embodiment, the existing standard is reused by using a field already defined for proprietary applications, which therefore does not disrupt the operation of a receiver that would only be of the NFC type, and allows the IBC type to be easily added.

The invention also relates to a device for adapting the communication of a mobile terminal equipped with a near-field communication module, the device being adapted to set the mobile terminal to an NFC mode or to an IBC mode so as to receive a message in an electromagnetic field, characterized in that it is configured for implementing the following on the mobile terminal:

receiving, from a reader terminal, a message inviting communications according to a type of near-field communication;

detecting a type of near-field communication in the received invitation message;

transmitting, if said type of communication indicates an IBC communication, and the mobile terminal is set to an IBC mode, a pairing request over a return channel distinct from the near-field channel.

The invention also relates to a mobile terminal comprising such an adaptation device.

The invention also proposes a method for inviting communications on a terminal, called reader terminal, of the NFC type, said reader terminal being adapted to invite according to at least one NFC type near-field communication and one IBC type near-field communication, the method being characterized in that it comprises, on the reader terminal set to NFC reader mode so as to transmit a message in an electromagnetic field, the following steps:

transmitting, to a mobile terminal, a message inviting communications according to a type of near-field communication;

receiving, if said type of communication indicates an IBC communication, a pairing message over a return channel distinct from the near-field channel.

Advantageously, according to the invention, the proposed NFC reader terminal can be a commercial reader terminal to which the IBC functionality has simply been added, in the form of a specific message to be transmitted in the near-field, in the same manner as the NFC invitation messages, or "polling" messages. Once such an invitation message is transmitted, the reader terminal simply needs to monitor a pairing request on a channel distinct from the NFC. If this request does not arrive, this means that the mobile terminal is set to NFC mode, or that it does not have the IBC, or the NFC (or, therefore, the IBC).

According to a particular embodiment of the invention, the method as described above is further characterized in that inviting according to at least one NFC type near-field communication type and one IBC type near-field communication comprises the following sub-steps, repeated cyclically:

transmitting invitation messages to the mobile terminal according to an NFC type communication, according to the standardized NFC polling mechanism;

transmitting an invitation message to the mobile terminal according to an IBC type communication.

Advantageously according to the invention, the proposed NFC reader terminal complies with the polling mechanism stipulated by the NFC standard, and notably defined in the specifications of the NFC forum. Thus, the reader terminal simply needs to add the new IBC message to its polling sequence, without any loss of compatibility with the standard NFC mode.

The invention also relates to a device for inviting communications on a reader terminal equipped with a near-field communication module, said device being adapted to set the reader terminal to NFC reader mode so as to transmit a message in an electromagnetic field, and to invite communications according to at least one NFC type near-field communication and one IBC type near-field communication, characterized in that it is configured for implementing the following on the reader terminal:

transmitting a message inviting communications according to a type of near-field communication to a mobile terminal;

receiving, if said type of communication indicates an IBC communication, a pairing message over a return channel distinct from the near-field channel.

The invention also relates to a reader terminal comprising such an invitation device to be communicated.

The invention also relates to a system comprising a mobile terminal and a reader terminal as defined above.

The invention also relates to computer programs comprising instructions for implementing one of the above methods according to any one of the particular described embodiments, when said program is executed by a processor. The method can be implemented in various ways, notably in wired form or in software form. This program can use any programming language, and can be in the form of source code, object code, or of intermediate code between source code and object code, such as in a partially compiled form, or in any other desirable form.

The invention also relates to a computer-readable storage medium or information medium comprising instructions of a computer program as mentioned above. The recording media mentioned above can be any entity or device capable of storing the program. For example, the medium can comprise a storage means, such as a ROM, for example, a CD-ROM or a microelectronic circuit ROM, or even a magnetic recording means, for example, a hard disk. Moreover, the recording media can correspond to a transmissible medium such as an electrical or optical signal, which can be routed via an electrical or optical cable, by radio or by other means. The programs according to the invention notably can be downloaded over a network of the Internet type.

Alternatively, the recording media can correspond to an integrated circuit, in which the program is incorporated, with the circuit being adapted to execute or to be used to execute the method in question.

LIST OF FIGURES

Further features and advantages of the invention will become more clearly apparent upon reading the following description of particular embodiments, which are provided by way of simple illustrative and non-limiting examples, and the accompanying drawings, in which:

FIG. 1 illustrates the context of the invention according to an IBC mode and an NFC mode;

FIG. 2 illustrates an architecture of an IBC/NFC mobile terminal according to a particular embodiment of the invention;

FIG. 3 illustrates an architecture of a reader terminal, or IBC/NFC terminal, according to a particular embodiment of the invention;

DESCRIPTION OF AN EMBODIMENT OF THE INVENTION

General Principle of the Invention

Figure 4:
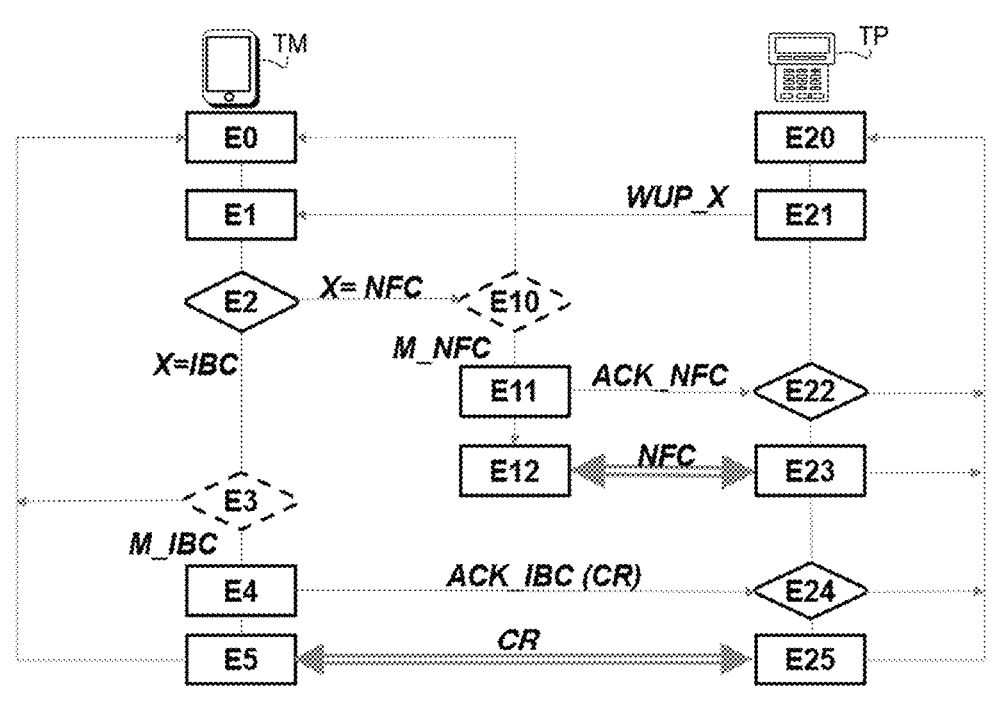
FIG. 4 illustrates steps of initializing the IBC/NFC communication method according to one embodiment of the invention.

The general principle of the invention involves using a specific protocol between the reader terminal and the IBC/NFC mobile terminal to initialize a communication according to either mode, in the case of a mobile terminal that is able to operate in both modes, which is the case of most mobile phones, or smartphones, on the market. Notably, by receiving an IBC type communication request, the mobile terminal will establish the software and hardware actions required to allow the transaction by the body, whereas by receiving an NFC communication request, it will establish the standard NFC communication, according to the prior art. To this end:

1. The mobile terminal is set to NFC or IBC mode. It optionally controls the NFC-IBC component of the mobile terminal so that it is set to the correct mode; indeed, an IBC message can be received in an NFC hardware mode, but the message will be of poor quality if no adaptation has been carried out. Next, it performs "pooling", i.e., it listens until an appropriate message is received. If it is in one of the two modes and it receives an initialization message in this mode, it launches the transaction. However, if it is in one of the two modes and it receives the initialization message in the other mode, it keeps waiting for an appropriate message.

2. The reader terminal, which a priori does not know how to distinguish an NFC transaction from an IBC transaction, periodically transmits NFC and IBC messages, in this case complying with the "polling" protocol defined by the NFC standards. Depending on the response it receives, it deduces one of the two modes therefrom, and can initiate the transaction. In particular, if it receives an NFC response, it knows that it is dealing with an NFC mobile terminal; if it receives a message over another radio channel, notably a pairing request, it knows that it is dealing with an IBC mobile terminal. This return channel can be of the Bluetooth, Wi-Fi, Li-Fi, 4G or 5G cellular type, etc., as long as it is a "short" distance transmission channel, for example, less than 10 meters, different from the near-field channel.

Particular Embodiments of the Invention

FIG. 1 illustrates the context of the invention, in IBC and NFC modes, respectively.

In both modes, the user (2) carrying the mobile terminal equipped with an NFC-IBC module approaches until they are almost touching the reader terminal TP for implementing a service, for example, a monetary transaction. The terminals TP and TM are able to directly communicate in the near-field (NFC) or via an electromagnetic field (NF) using the body of the user (IBC).

The reader terminal TP can be, for example, an EPT (Electronic Payment Terminal), or even a mobile terminal with an NFC module set to reader mode, a connected object (IOT), a personal computer, a computer mouse, a home gateway, etc. It is able to transmit NFC type radio signals via an NFC antenna. In this example, the reader terminal (TP) comprises a surface made up of the antenna optionally protected and adapted to react when the user brushes against it or comes close to it in IBC mode, for example, by approaching their hand, or when they approach their mobile terminal in NFC mode. The term "surface" is by no means limiting and is provided by way of an illustration, with the antenna being the only means essential for the operation of the device.

The mobile terminal TM is, according to this example, a mobile terminal equipped with an NFC-IBC module. The term "NFC-IBC module" is understood to mean a near-field reception module capable of receiving an electromagnetic wave either directly (NFC mode) or after it passes through the body of the user (IBC mode). A conventional NFC component is able to receive degraded quality IBC signals, but techniques nevertheless exist for improving the quality of the received signal in IBC mode by means of a software and/or hardware adaptation of the NFC component and its antenna. It is also able to establish a two-way return channel (for example, Bluetooth) with the reader terminal. According to another example, this mobile terminal TM could be a computer, a connected object, a tablet, etc.

In the IBC mode shown on the left of FIG. 1, denoted M_IBC, the IBC module acts like a portable device naturally capable of receiving radio carrier waves, via an antenna, through the body of the user (2). To this end, the mobile terminal is located in the immediate vicinity of the user (2), without necessarily being in direct contact with them. For example, the mobile terminal is placed inside a pocket of the user. It also could be placed in a bag, or around their neck, etc. In these configurations, the mobile terminal is considered to be separated from the body of the user (2) by no more than a few centimeters. The distance is less than 5 cm, for example. When the user executes a movement toward the reader terminal, typically by touching or brushing against the receiving surface comprising the NFC antenna of the reader terminal with their hand, a radio carrier wave is emitted from the reader terminal through the body of the user. Two phases then take place on the mobile terminal in a transparent manner for the user, in order to provide the service. Firstly, an IBC type contactless phase, which can be considered to be pre-pairing, is initiated. The mobile terminal receives an IBC type message, and if the message is correct, matches, or pairs, over the return channel with the reader terminal in order to allow two-way communication between the two terminals. Indeed, it is not possible to contemplate transmitting a large response message via the body of the user from a mobile terminal. Such a dialogue, involving a pairing phase followed by establishing a two-way communication using a Bluetooth link, is described in document WO 2017/093639, included herein for reference purposes.

In the "conventional" NFC mode shown in FIG. 1, on the right (M_NFC), the carrier performs the transaction by physically approaching the mobile terminal of the reader terminal. The communication is naturally two-way on the NFC channel, but the amount of exchanged data remains very limited.

The use of either mode must be transparent to the user, i.e., they must be able to perform the transaction with the reader terminal either in IBC mode, while keeping the mobile terminal in a pocket, or in NFC mode, by removing the mobile terminal from their pocket and by approaching the reader terminal, without intervening on their mobile terminal. The embodiments described in more detail hereafter allow this transparency, and automation of the method, to be provided.

FIG. 2 illustrates an architecture of the mobile terminal TM according to a particular embodiment of the invention.

The mobile terminal TM has the conventional architecture of a mobile telephone, of the smartphone type, and notably comprises a memory MEM, a processing unit equipped, for example, with a processor PROC, and controlled by the computer program PGR stored in the memory MEM. Upon initialization, the code instructions of the computer program PGR are loaded, for example, into a memory before being executed by the processor PROC. The processor PROC of the processing unit UT notably implements the steps of the adaptation method according to any one of the particular embodiments described in further detail hereafter, according to the instructions of the computer program PGR.

The mobile terminal also comprises the following modules:

a module NFC for managing NFC and IBC communications. This module conventionally comprises a contactless communication integrated circuit (CLF: Contactless Frontend) associated with an antenna ANT initially provided to receive NFC signals; the circuit formed by the CLF and the antenna can be adapted to receive the IBC signals via the human body with better quality;

a module DNF for managing IBC/NFC near-field communications. This module is notably responsible for the IBC or NFC mode selection steps, either directly (for example, from the user via an HMI of the mobile terminal) or via a "pooling" mechanism, which for the mobile terminal involves setting a mode (for example, IBC) and then listening on the near-field communication channel, and validating this mode if a received message corresponds to the selected mode;

a module PIBC for specifically managing IBC communications. This module notably executes the steps needed for decoding the IBC initialization message and for establishing the return channel in order to carry out the transaction in IBC mode. Optionally, it is also able to control the adaptation of the NFC circuit (CLF component and its antenna) to improve the IBC reception;

a module PNFC for managing NFC communications. This module notably executes the steps conventionally needed for establishing and executing the NFC transaction. It sets the mobile terminal to card emulation mode or to reader mode, according to the prerequisites of the targeted application;

a communication module distinct from the NFC module, for example, Bluetooth (or Wi-Fi, Li-Fi, etc.), denoted CR in the figure, for providing the return channel, and therefore the two-way functionality of the IBC communication. The module CR is connected to an antenna, either directly or via the mobile telephone:

in the first case, the module CR is associated, for example, with the NFC component, optionally on the same substrate. For example, it is connected to the output of the antenna demodulator, optionally by means of other circuits. It receives the data demodulated and optionally processed by a microprocessor, and is responsible for establishing a Bluetooth communication channel;

in the second case, the module CR is located elsewhere, for example, in the mobile terminal. The demodulated antenna signals are transmitted to the microprocessor of the mobile terminal that is responsible for establishing the return channel (Bluetooth, Wi-Fi, cellular radio, etc.). Advantageously in this case, the corresponding module natively present on the mobile terminal can be reused;

a user interface HMI, adapted to transmit instructions or information messages to the user and to receive information from them. For example, the user interface is the screen of the smartphone. In another embodiment, the interface is an audio interface for receiving the messages and instructions. The HMI can also comprise a keyboard, a microphone, etc. For example, it can be arranged to temporarily enter the preferred mode (IBC or NFC) of the user for a transaction or a set of transactions.

FIG. 3 illustrates an architecture of a reader terminal, or IBC/NFC terminal, according to a particular embodiment of the invention.

The reader terminal TP has the conventional architecture of a computer, and notably comprises a memory MEM', a processing unit equipped, for example, with a processor PROC', and controlled by the computer program PGR' stored in the memory MEM'. Upon initialization, the code instructions of the computer program PGR' are loaded, for example, into a memory before being executed by the processor PROC'. The processor PROC' of the processing unit UT' notably implements the steps of the adaptation method according to any one of the described particular embodiments, according to the instructions of the computer program PGR'.

The reader terminal also comprises:

a module NFC' for managing NFC or IBC near-field communications. This module conventionally comprises a contactless communication integrated circuit (CLF: Contactless Frontend) associated with an antenna ANT provided to emit and receive NFC signals;

a module DNF' for managing IBC/NFC near-field communications. This module is notably responsible for the IBC or NFC mode selection steps, using a "pooling" mechanism, which in this case means that the reader terminal periodically transmits messages of a certain type (NFC or IBC) and listens to the response over a return channel. If it has transmitted an IBC frame and receives a response over the return channel (Bluetooth), it can initiate the IBC communication. Otherwise, if it has transmitted an NFC frame, and receives a response over the NFC channel, conventionally they just need to verify the NFC message (the type of emulated card, etc.) according to a pooling mechanism that is well known in the prior art and is described in the "NFC Activity Technical Specification" of the NFC forum (NFC forum—TS-Activity—1.0 2010-11-18);

a module PIBC' for managing IBC communications. This module notably executes the steps needed for establishing the IBC invitation message, which will be described with reference to FIG. 5, for introducing this message into the polling mechanism, in association with the module PNFC', and for establishing the return channel with the mobile terminal, in order to carry out the transaction in IBC mode;

a module PNFC' for managing NFC communications. This module notably executes the steps conventionally needed for the NFC transaction according to the prior art notably made up of the NFC 14443 standard and the aforementioned technical specification. The main steps of initializing the NFC communication between a transmitter and the card are described in section 3 of standard (*ISO 14443-3—Identification cards—Contactless integrated circuit cards—Proximity cards—Section 3: Initialization and anti-collision*). It also sets the reader terminal to NFC reader mode;

a module CR' intended to transmit and receive data over the return channel. The module is notably arranged for implementing the steps of receiving/transmitting messages relating to the transaction over the return channel;

optionally, a user interface HMI', adapted to transmit instructions or information messages to the user. For example, the user interface is a screen on which the messages and instructions are displayed. In another embodiment, the interface is an audio interface for playing the messages and instructions. The HMI can also comprise a keyboard, a microphone, etc. For example, it can be arranged to implement an invitation step of the communication method.

It should be noted that any commercial reader terminal advantageously can be used, provided that this is beneficial for the modules PIBC', allowing it, by simply updating the software of the reader terminal, to be able to transmit a message with the features of the IBC invitation message according to the invention, and to be introduced into the polling mechanism, via its NFC antenna.

Figure 6:
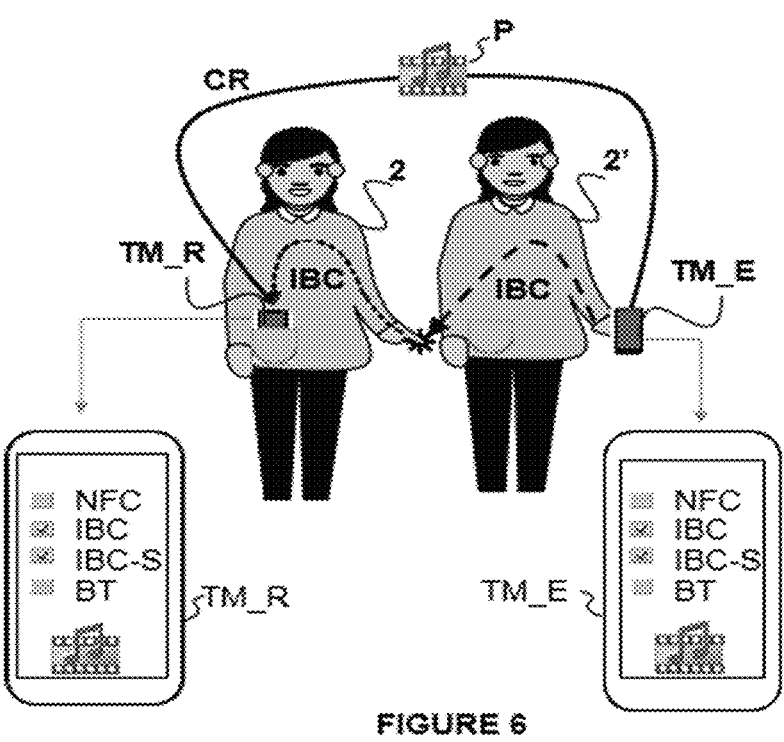
FIG. 6 illustrates a data transfer between two mobile IBC terminals according to one embodiment.
Figure 7:
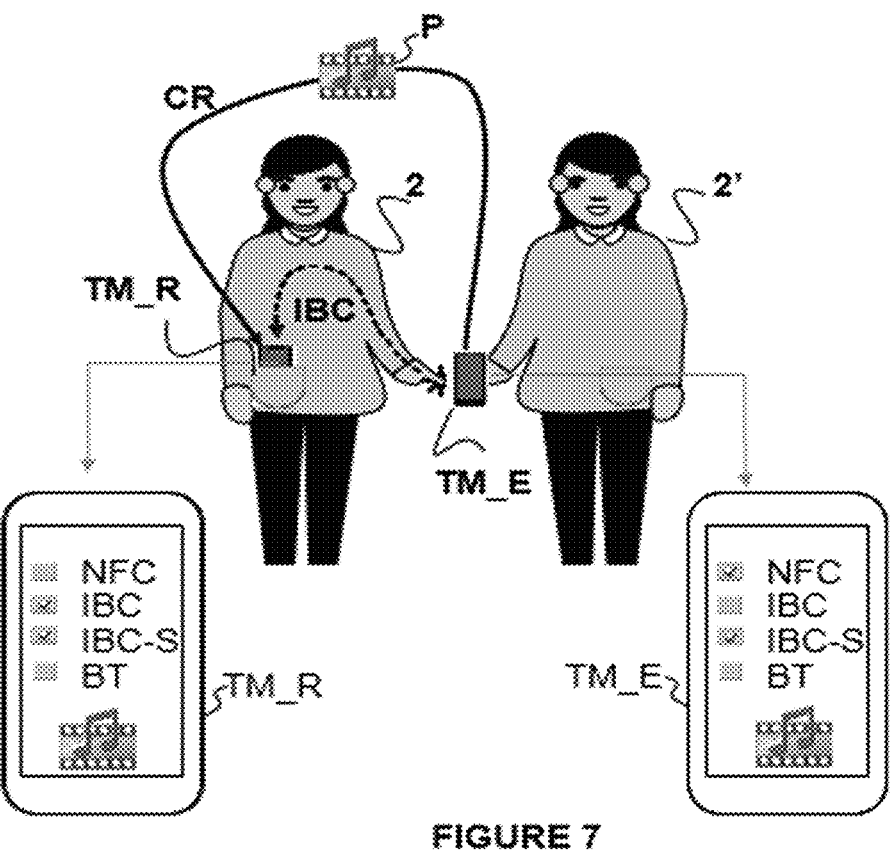
FIG. 7 illustrates a data transfer between two mobile IBC terminals according to another embodiment.
Figure 8:
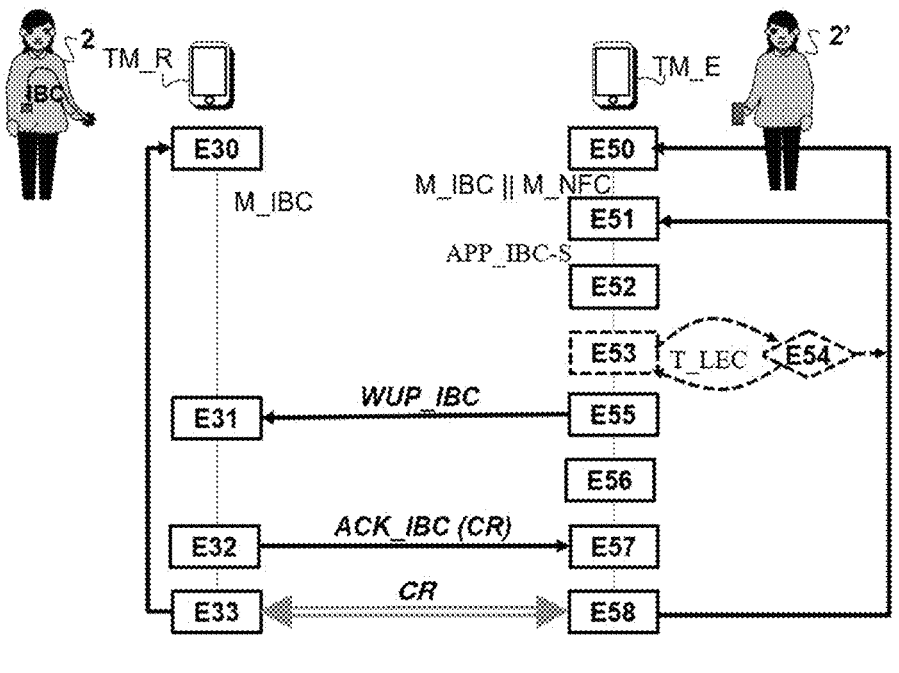
FIG. 8 illustrates the steps of a method for transferring data between two mobile IBC terminals according to one embodiment.

It also should be noted that the reader terminal TP can be a transmitter mobile terminal, the architecture of which is similar to that of the device TP described herein. However, a mobile terminal is not adapted to be set to reader mode for a long time since this mode drains the batteries. FIGS. 6 to 8 propose an embodiment that solves this problem.

FIG. 4 illustrates steps of the NFC/IBC adaptation method according to one embodiment of the invention.

According to this embodiment, a mobile terminal TM attempts to validate an electronic transaction according to one of the two contexts respectively shown in FIG. 1, i.e., the transaction is carried out either in NFC, if the user 2 approaches their mobile terminal with the reader terminal (M_NFC), or in IBC, if they keep their mobile terminal in a pocket (M_IBC).

By way of a reminder, NFC communications can cover two types of applications linked to two different operating modes on an NFC device:

the first mode, called reader mode, relates to reading data on transponder type devices, or NFC cards. The device is active in this mode. It transmits commands to a mobile terminal as it would send them to a contactless card according to standard ISO 14443 (or FeliCa). It generates a magnetic field, which, in contact with the antenna of the passive card, induces an electric current that powers the card;

the second mode, called emulation mode, implements an emulation of a near-field communication module, typically for securing electronic transactions between an application stored on the device and an external reader terminal, or reader terminal; in this mode, the NFC equipment of the device is used passively. It simulates the behavior of a passive contactless card.

Moreover, NFC devices meeting standard ISO 14443 communicate using a range of technologies with respective distinctive features. The generic NFC standard is subdivided into three NFC-A, NFC-B and NFC-F sub-standards. These three sub-standards use a 13.56 MHz field. They differ in terms of how this field is amplitude modulated, of the coding of the transmitted symbols as well as of the bit rate. An NFC compatible mobile terminal, such as a mobile telephone, generally supports several, or even all, of the sub-standards. Similarly, a commercial reader terminal generally supports several types of cards.

NFC standards, notably the aforementioned NFC Activity Technical Specification standard, specify a protocol for establishing the technology to be used when more than one technology is available (NFC-A, NFC-B, NFC-F) on the reader terminal. This is referred to as "polling". The protocol limits the reader terminal to transmitting a near-field invitation message, which requests a response from one of the available sub-standards, starting with NFC-A. The mobile terminal (or the card) that listens will only respond if it is capable of communicating using NFC-A; the reader terminal reacts within a limited time interval in the absence of a response by transmitting a second invitation signal using a second technology, for example, NFC-B. This process is repeated until the listening mobile terminal responds with an invitation response signal indicating the compatibility with an NFC sub-standard.

The embodiment described herein adds a new NFC-IBC sub-standard to the existing sub-standards. This new sub-standard is integrated into the polling mechanism while maintaining the compatibility with the existing NFC sub-standards.

Hereafter, "NFC mode" refers to one of the sub-modes defined by the NFC forum, and "IBC mode" refers to the additional sub-mode as set forth in the embodiments of the present invention.

Figure 5:
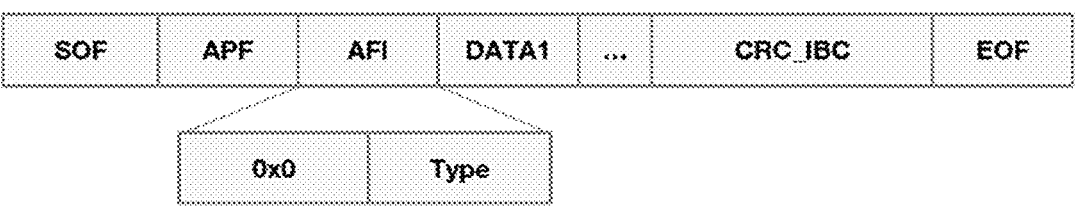
FIG. 5 illustrates the initialization frame of the IBC/NFC communication according to a particular embodiment of the invention.

FIG. 5 will now be described with reference to the following steps, E0 to E25:

During an initialization step E20, the reader terminal is set to reader mode and prepares its invitation message WUP (for Wake-UP) for the targeted type of sub-standard (NFC-B, NFC-A, NFC-F or NFC-IBC) with the intention of initiating a dialogue between the reader terminal and the mobile terminal, in NFC or IBC mode, in accordance with the NFC standards, enhanced according to the invention with a new IBC message integrated with the polling mechanism.

During an initialization step E0, the mobile terminal TM activates its NFC module and is set to card emulation mode. It then decides to set itself either to IBC mode (M_IBC) or to NFC mode (M_NFC). Then, the mobile terminal TM approaches the terminal (NFC mode) or the hand of the user approaches the terminal (IBC mode), thereby authorizing the transmission of the carrier wave of the invitation message through their body. In both cases, the mobile terminal receives the electromagnetic field generated by the reader terminal, as previously explained.

During a step E21, the reader terminal enters a polling method as described above, i.e., it successively (and cyclically) transmits, until a response is acquired, a type of invitation corresponding to the sub-standards that it implements (NFC-A, NFC-B, NFC-F, NFC-IBC, etc.). This invitation is denoted WUP_X in the figure, where X assumes the value A, B, F, IBC. The messages of the NFC sub-standards are specified by the standard and will not be described herein.

The new IBC initialization message complies with the format of the messages of the standard. According to one example, described hereafter with reference to FIG. 5, it is an NFC-B type message, the fields of which are beneficially re-used to indicate the new type of communication (IBC) and optionally service data and/or, in a non-exhaustive manner, a random datum intended for subsequent pairing over the return channel, a type of return channel (CR) to be used (BT, Wi-Fi, 5G, etc.), etc. Thus, in the NFC mode, the messages exchanged between the reader terminal and the mobile terminal are not modified. In the IBC mode, the new initialization message, when it is received by the mobile terminal, allows the IBC communication procedure to be launched: pairing and continuing the transaction over the return channel (Bluetooth, for example).

During a step E1, the mobile terminal TM receives the initialization message, WUP_X with X=IBC or NFC-(A, B, F).

During a step E2, it determines the type of received message (X); if X=NFC, it starts the NFC recognition procedure defined from step E10, otherwise it starts the IBC recognition procedure defined from step E3.

During step E10 (X=NFC, the received message is an NFC invitation), a test can be carried out as to whether the mobile terminal is actually set to NFC. If this is not the case, the procedure returns to step E0, otherwise the conventional NFC procedure starts with step E11. It should be noted that this step is optional insofar as, if the mobile TM receives an NFC message while it is set to IBC mode, it is irrelevant if it responds to the NFC message since this response will not be received by the reader terminal. Indeed, such a response signal will be too attenuated by the distance between the mobile terminal, set to card emulation mode, and the reader terminal (they are separated in the IBC mode by the body of the user). Indeed, the mobile terminal operates by load modulation, i.e., by induction. Standard 14443 indicates that, in such a situation, the mobile terminal set to emulation and the reader terminal can no longer communicate if they are more than approximately 10 cm apart. Thus, the reader terminal cannot receive such a message, and therefore returns to step E20 or E21 at the end of the time defined by the NFC "polling" mechanism.

During steps E11 and E12, a standard NFC type transaction is carried out, with, in step E11, the mobile terminal sending the NFC acknowledgement if the type of NFC request corresponds to the capabilities of the mobile terminal (for example, ACK-A to confirm operation in NFC-A mode), then, if the reader terminal validates the communication during step E22, upon receipt of the response message, the NFC transaction is conventionally executed during steps E12 and E23, for example, the validation of a contactless payment.

During step E3 (X=IBC, the message received from the reader terminal is an IBC invitation of the WUP-IBC type), a test can be carried out to determine whether the mobile terminal is actually set to IBC. If this is not the case (it is in NFC mode), the procedure returns to step E0, otherwise the conventional IBC procedure starts with step E4. It should be noted that this step E3 is optional insofar as, if the mobile TM receives an IBC message while it is set to NFC mode, it cannot respond to this message that does not correspond to an expected NFC format (defined by standard 14443). Thus, the reader terminal does not receive a response and therefore returns to step E20 or E21 at the end of the time defined by the NFC/IBC "polling" mechanism.

If the test is positive in step E3 (if X=IBC and the mobile terminal is in IBC mode), step E3 (or step E2 if step E3 is not implemented) is followed by step E4, during which the mobile terminal decodes the message (random datum, type of service, etc.), then initializes the return channel: it optionally activates the channel (for example, by opening the Bluetooth or the Wi-Fi on the terminal if this has not already happened), requests pairing with the reader terminal on this channel (BT, etc.) by transmitting, for example, an IBC transaction confirmation, denoted ACK_IBC, over this channel. This message ACK_IBC notably can include the encrypted random datum used to secure the return channel.

These steps are described in document WO 2017/093639, included herein for reference purposes.

Then, if the reader terminal validates the communication during step E24 on receipt of the response message, notably since it has received a message over the expected return channel with the expected random datum, the communication continues on this return channel during steps E4 and E24, for the reception/transmission of messages relating to the IBC transaction (to validate a payment, a ticket balance, or to exchange any other message required for the communication, etc.)

FIG. 5 illustrates an IBC initialization message according to one embodiment.

The main steps of initializing the NFC communication between a transmitter and a card are defined in section 3 of ISO 14443-3. For a B type card, the reader terminal sends an identification request (called "REQB" or "WUPB") and waits for a response (called "ATQB") from the mobile terminal.

The invention proposes reusing such a protocol message, so as to introduce an indication of the "IBC" type and optionally a certain amount of data required for the subsequent IBC communication (random datum, type of request, type of IBC application, type of return channel, etc.).

As illustrated in FIG. 5, and described in the aforementioned standard 14443-3, the normalized REQB/WUPB message contains:

a start of frame byte, SOF;

an anti-collision prefix byte APf (with a fixed value, in hexadecimal 0x5);

a byte, called "AFI" byte, indicating the application family representing the type of application targeted by the NFC reader (all applications—code 00, transport, finance, telecommunications, etc.). Only the proximity cards with applications of the type indicated by the AFI are authorized to respond to an REQB/WUPB command with an AFI different from "00". When AFI is equal to "00", all the proximity cards must process REQB/WUPB. These coding rules are specified in table 12 of the aforementioned standard 14443, reproduced below;

a "param" byte notably indicating the type of request (REQB or WUPB);

a "CRC_B" byte on two bytes comprising a code for detecting and correcting any errors.

TABLE 12

| | | AFI coding | |
|---|---|---|---|
| Most significant half-byte of the AFI | Least significant half-byte of the AFI | Meaning - The proximity cards comply with | Examples/Note |
| '0' | '0' | All the families and sub-families | No pre-selection of an application |
| X | '0' | All the sub-families of family X | Large pre-selection of applications |
| X | Y | Only the Y-th sub-family of family X | |
| '0' | Y | Private sub-family Y only | |
| '1' | '0', Y | Transport | Mass transport, Bus, Airline, etc. |
| '2' | '0', Y | Finances | FPI, Banks, Retailers, etc. |
| '3' | '0', Y | Identification | Access checks, etc. |
| '4' | '0', Y | Telecommunication | Public telephones, GSM, etc., |

TABLE 12-continued

| | | AFI coding | |
|---|---|---|---|
| Most significant half-byte of the AFI | Least significant half-byte of the AFI | Meaning - The proximity cards comply with | Examples/Note |
| '5' | '0', Y | Medical | |
| '6' | '0', Y | Multimedia | Internet services, etc. |
| '7' | '0', Y | Gambling | |
| '8' | '0', Y | Data storage | Portable files, etc. |
| '9'-'F' | '0', Y | RFU | |

FIG. 5 illustrates the possible re-use of these fields, relating to a particular implementation mode.

The IBC initialization message WUP_IBC contains, according to the first example (WUP_IBC (1)), the start of frame message (SOF), immediately followed by the data bytes (DATA1, DATA2, DATA3, etc.) required for establishing the IBC request. Since the AFI field is overwritten, a B type card or mobile terminal will not respond to this request. The data fields can notably include the random datum, IBC service information, the type of IBC application (transport, file transfer, etc.), etc. The message also contains a two-byte "CRC_IBC" byte comprising a code for detecting and correcting any errors.

The IBC initialization message WUP_IBC contains, according to the second example (WUP_IBC (2)):

a first non-modified, anti-collision prefix byte APf (although the anti-collision algorithm is not very useful in the case of IBC, since it is difficult to have several users whose hand is simultaneously present facing the reader terminal);

the "AFI" byte adapted for the IBC while maintaining compatibility with the standard. With reference to table 12 (reproduced above) of the aforementioned standard, ISO 14443, the value 0x0 of the first half-byte corresponds to a private sub-family of the type specified in the second half-byte. It is therefore possible to use this second half-byte in order to specify the type of IBC application, while preserving the normalized values (for example, '1' for transport, '2' for finances, etc., like the '1' to '9' values of the first half-byte of the table).

Naturally, these two examples are by no means limiting and a person skilled in the art could contemplate any adaptation of this message WUPB/REQB or of another NFC initialization message. For example:

the hexadecimal values 0x9 to 0xF of the first half-byte of the AFI field are reserved; it is therefore possible, without infringing on the standard, to use one of these reserved values, for example, 0x9 for the IBC applications, generally, the second half-byte of the field comprising the type of IBC application;

a modification of the value of the SOF field would allow the mobile terminal to immediately detect a non-NFC message;

etc.

FIGS. 6 and 7 illustrate an IBC communication according to another embodiment, for transferring data between two mobile terminals.

The receiver mobile terminal TM_R can have the type of architecture shown in FIG. 2. The transmitter mobile terminal TM_E can have the type of architecture shown in FIG. 3, i.e., it is capable of acting like a reader terminal.

According to this embodiment, the user of the receiver mobile terminal TM_R is set to IBC mode. For example, they make this choice by ticking a box in the parameters of their mobile terminal, as shown in FIG. 6 or 7. The user of the transmitter terminal TM_E can choose to set their terminal to NFC or IBC mode. For example, they make this choice by ticking a box in the parameters of the terminal, as shown in FIG. 6 or 7: the configuration of the mobile terminal allows, according to this example, an NFC mode to be ticked (which already exists on most mobile terminals on the market) or an IBC mode to be ticked for the connectivity of the mobile terminal. According to the example, it is also possible to select a BT (Bluetooth) mode, which is notably useful for the IBC return channel. In addition, in IBC mode, a new application is authorized, shown in the figure by "IBC-S", which means that the mobile terminal is authorized to use an IBC data transfer application. This indication of the type of service also can be proposed, for example, in the data field, or in the "type" field of the invitation message proposed in FIG. 5. Naturally, many other IBC services could exist, such as, for example, gaming, streaming, services, etc.

It should be noted that in IBC mode, optionally, the user does not need to activate the module CR of the return channel (according to the example, Bluetooth (BT)) before using their mobile terminal in IBC mode since the IBC application can automatically do this for them during the IBC connection, then after the data has been transferred, the return channel can be deactivated.

The two mobile terminals TM_R and TM_E attempt to communicate in order to exchange data, notably large amounts of data that could not be transmitted using near-field technology, the throughput capacities of which are limited. Indeed, the maximum throughput offered by NFC is 424 kb/s, which is insufficient for authorizing a transfer of large amounts of data. Moreover, a transaction of this type carried out in NFC or IBC implies that the mobile terminal or the hand of the user remains placed on the reader terminal, which is uncomfortable and requires a high level of positioning precision.

According to this example, the user 2' of the terminal TM_E wishes to transmit a video P to the terminal TM_R of the user 2 (alternatively, it could be any document such as sound, web pages, photos, etc.).

Within the context of FIG. 6, the two users are set to IBC. They have both activated the IBC option and the IBC-S application on the terminals TM_R and TM_E. When the user 2' touches the user 2 (or conversely, irrespective of when they arrive in proximity according to IBC), their mobile terminal, which is transiently set to reader mode, transmits the IBC frame that passes through their body, then through that of the user 2, and reaches the mobile terminal of the user 2, TM, set to emulation mode. By recognizing the IBC frame, by virtue of the protocol that has been described with reference to FIG. 4, or of the simplified protocol proposed with reference to FIG. 8, the mobile terminal TM_R of the user 2 establishes the IBC communication with that of the user 2', TM_E, via the activation of the return channel CR, according to the example using Bluetooth. The first user can stop touching the second user, the file P is transferred and the return channel is optionally closed.

Within the context of FIG. 7, the user of TM_E is set to NFC and the other to IBC. When the user 2' touches the user 2 with their mobile terminal TM_E (or conversely, irrespective of when the mobile terminal TM_E and the user 2 are in proximity according to NFC), this mobile terminal, which is transiently set to reader mode, transmits the IBC frame that passes through the body of the user 2, and reaches the mobile terminal of the user 2, TM_R, set to emulation mode. By recognizing the IBC frame, by virtue of the protocol that has been described with reference to FIG. 4, or of the simplified protocol proposed with reference to FIG. 8, the mobile terminal of the user 2 establishes the IBC communication with that of the user 2', TM_E, via the activation of the return channel CR, for example, using Bluetooth. The first user can stop touching the second user, the file P is transferred and the return channel closed.

Optionally, in both cases, closing the channel is accompanied by the deactivation of the corresponding communication means (Bluetooth, Wi-Fi, mobile data), particularly if it was deactivated before starting to transfer data.

It should be noted that it is rare for a mobile telephone to be set to reader mode because the power required during "polling" is high, and thus prohibitive for the battery. However, if the user 2' has ticked the IBC-S application, the mobile terminal TM_E can be set to reader mode in a controlled manner, either for a limited period of time, or solely for the duration for sending the IBC invitation message, which reduces the problem of power consumption, and therefore of battery consumption. FIG. 8 illustrates this aspect.

FIG. 8 illustrates the steps of a method for transferring data in IBC mode according to one embodiment of the invention.

According to this embodiment, a mobile terminal TM_E of a user 2' equipped with NFC and IBC attempts to transmit large amounts of data to another mobile terminal TM_R of a user 2 equipped with IBC, according to one of the two contexts respectively shown in FIGS. 6 and 7, i.e., the transaction is carried out when the user 2' approaches either their mobile terminal TM_E (FIG. 7), or their hand (FIG. 6), toward the user 2, who, for their part, keeps their mobile terminal TM_R in a pocket.

FIG. 8 will now be described with reference to the following steps E30 to E58:

During an initialization step E30, the mobile receiver terminal TM_R activates its NFC module (CLF and antenna). By default, the "card emulation" mode is generally selected on a mobile terminal. Then it is set to IBC (M_IBC) mode and selects the "IBC-S" option, which corresponds to an IBC data transfer application. According to the example of FIGS. 6 and 7, they tick the two corresponding boxes on the screen of their smartphone, via the HMI module, for example, in the parameters of the mobile terminal (box to be ticked in the connectivity options of the terminal), or on the screen for the duration of the transaction. The IBC mode and the IBC-S application therefore can be set by default for the mobile terminal TM_R, i.e., it can operate for several transactions without user intervention.

During an initialization step E50, the mobile terminal TM_E has activated its NFC module (CLF and antenna). By default, the "card emulation" mode is generally selected on a mobile terminal. Then it is set to IBC (M_IBC) or NFC (M_NFC) mode and selects the "IBC-S" option, which corresponds to an IBC data transfer application. According to the example of FIGS. 6 and 7, they tick the corresponding boxes on the screen of their smartphone, via the HMI module, for example, in the parameters of the mobile terminal (box to be ticked in the connectivity options of the terminal, for example), or on the screen for the duration of the transaction. The IBC mode (FIG. 6) or the NFC mode (FIG. 7), as well as the IBC-S option (FIGS. 6 and 7), can be set by default for the mobile terminal TM_E, i.e., it can operate for several transactions without user intervention.

During a step E51 of initializing the transfer, the user decides to use the "IBC-S" option to actually transfer data P to the mobile terminal TM_R of the user 2, which terminal is in their pocket. To this end, the user 2' launches an application, for example, an applet APP_IBC-S of the program PGR'. The applet can be selected by the user (for example, on the screen of their smartphone) or launched automatically when they select content to be transferred, for example, via a menu selection that appears on the screen to indicate that the content (P) can be transferred in IBC mode, or any other possibility for initiating the transfer of the content (P) to the user 2 in IBC mode.

During a step E52, the mobile terminal TM_E is set to NFC reader mode, as it has been previously defined. Such setting occurs automatically and cyclically on some of the NFC mobile terminals on the market during the polling phase, and is preferably very short since it is energy-consuming. On other mobile terminals on the market, the polling phase is only triggered when a contactless card is detected. Therefore, setting to reader mode in step E52 is either automatic or forced.

During a step E53, the method sets a timer (T_LEC) for the reader mode. Such a timer, corresponding to the maximum duration of the time during which the mobile terminal can remain in reader mode, is also called "time-out". It is conventionally monitored as a background task by the processor of the system associated with a clock. For example, T_LEC can assume a value of 10 seconds. Indeed, the mobile terminal TM_E cannot remain in reader mode for a long time, since this would drain its batteries. This step is optional because it is possible to deactivate the reader mode after transmitting the IBC invitation message. However, it is useful in the event that this emission would fail, because it prevents the mobile terminal from unnecessarily remaining in reader mode for too long.

Throughout the entire duration of the method, during step E54, the mobile terminal TM_E therefore tests the elapsed time since the timer T_LEC was set. It can perform this step as a background task. If the time is exceeded, it deactivates the reader mode and returns, for example, to step E50 or E51.

During a step E55, the method prepares the invitation message WUP_IBC for the targeted type of sub-standard, in this case IBC (since, even if the mobile terminal TM_E is in M_NFC mode, its recipient, the mobile terminal TM_R, is in M_IBC mode), with the aim of transferring content (video P). The message WUP_IBC can contain the type of IBC application, in this case IBC-S (as proposed in the "Type" field of the message WUB_IBC (2) of FIG. 4). It can also contain a random datum value, the type of return channel to be used, and/or any other data that is useful for the operation of the service.

Then, the user 2 comes into the vicinity of the user 2', either by approaching their mobile terminal TM_E, or by approaching part of their body, thereby authorizing the transmission of the carrier wave of the invitation message WUP_IBC through the body of the user 2'. For example, one of the users 2 or 2' places their hand on the shoulder of the other, or they hold the hand, etc. The mobile terminal TM_R receives the electromagnetic field, and therefore the message WUP_IBC, generated by the mobile terminal TM_E.

According to this embodiment, the method deactivates the reader mode as soon as the message is transferred, during step E56. The mobile terminal TM_E, whether in NFC or IBC mode, is reset to card emulation mode.

The invitation message WUP_IBC is received by the mobile terminal TM_R in step E31.

During step E32, the mobile terminal TM_R decodes the received message (type of communication, random datum, type of service, etc.). It notably can check that it is indeed an IBC invitation message (as explained, for example, with reference to FIGS. 4 and 5), and that the type of IBC application received (IBC-S) corresponds to its configuration. It can also read and encrypt the received random datum, and take note of the desired type of return channel. If the invitation message is correct, it initializes the return channel (BT, Wi-Fi, etc.) and sends an IBC transaction confirmation, optionally accompanied by the encrypted random datum, denoted ACK_IBC, over this channel.

The mobile terminal TM_E may or may not validate the communication during step E57 on receipt of the response message, depending on the content of said response message (it is indeed an IBC acknowledgement on the correct channel with the correct random datum, etc.). Then it deactivates the reader mode.

The communication continues over the return channel during steps E33 and E58, for receiving/transmitting messages relating to the transfer of the file P.

When the transfer is complete, the file P can be displayed, for example, on the screen of the mobile terminal TM_R. Optionally, a text or sound message can be sent to the user 2 of the terminal TM_R. Then, optionally, the return channel CR is closed and the IBC-S option may or may not be unticked.

It is clear that the embodiments that have been described above have been provided purely by way of a non-limiting indication, and that numerous modifications can be easily made by a person skilled in the art without departing from the scope of the invention.

The invention claimed is:

1. A method for adapting a communication of a mobile terminal equipped with a near-field communication (NFC) module, said mobile terminal being able to be set to an NFC mode or to an IBC (Intra-Body Communication) mode in order to carry out contactless transactions, and to receive a message in an electromagnetic field over a near-field channel, the method being implemented on the mobile terminal and comprising:

receiving, from a reader terminal, an invitation message inviting communications alternately according to types of near-field communication; and transmitting, in response to said invitation message indicating an IBC communication, and the mobile terminal being set to IBC mode, a pairing request over a return channel distinct from the near-field channel.

2. The method for adapting the communication of a mobile terminal as claimed in claim 1, wherein the method further comprises:

transmitting a command to switch to IBC mode to the near-field communication module.

3. The method for adapting the communication of a mobile terminal as claimed in claim 1, wherein transmitting a pairing request over a return channel is followed by:

establishing a two-way communication with the reader terminal over the return channel.

4. The method as claimed in claim 1, wherein said invitation message contains a random datum for establishing the return channel.

5. The method as claimed in claim 1, wherein said invitation message contains a type of IBC application.

6. The method as claimed in claim 1, wherein said invitation message is received during an ISO (International Standard Organization) 14443 type communication.

7. The method as claimed in claim 1, wherein the type of IBC communication is indicated in a field of the invitation message left empty by an NFC standard for a future use.

8. The method as claimed in claim 1, wherein the type of IBC communication is indicated in a field of the invitation message defined by an NFC standard for a proprietary application.

9. A device for adapting a communication of a mobile terminal equipped with a near-field communication (NFC) module, said device being adapted to set the mobile terminal to an NFC mode or to an IBC (Intra-Body Communication) mode in order to carry out contactless transactions, so as to receive a message in an electromagnetic field, wherein the device comprises:

a processor and a non-transitory computer readable medium comprising instructions stored thereon which when executed by the processor configure the device to implement the following on the mobile terminal:

receiving, from a reader terminal, an invitation message inviting communications alternately according to types of near-field communication;

and transmitting, in response to said invitation message indicating an IBC communication, and the mobile terminal being set to an IBC mode, a pairing request over a return channel distinct from the near-field channel.

10. A method for inviting communications on a terminal, called reader terminal, of an NFC (near-field communication) type, said reader terminal being adapted to invite according to at least one NFC type near-field communication and one IBC (Intra-Body Communication) type near-field communication, the method comprising, on the reader terminal set to NFC reader mode so as to transmit a message in an electromagnetic field:

transmitting, to a mobile terminal, an invitation message inviting communications alternately according to types of near-field communication; and receiving, in response to said invitation message indicating an IBC communication and the mobile terminal being in IBC mode, a pairing message over a return channel distinct from the near-field channel.

11. The method for inviting communications on a reader terminal as claimed in claim 10, wherein inviting according to at least one NFC type near-field communication and one IBC type near-field communication comprises the following sub-steps, repeated cyclically:

transmitting invitation messages to the mobile terminal according to an NFC type communication, according to a standardized NFC polling mechanism; and transmitting an invitation message to the mobile terminal according to an IBC type communication.

12. A device for inviting communications on a reader terminal equipped with a near-field communication (NFC) module, said device being adapted to set the reader terminal to NFC reader mode so as to transmit a message in an electromagnetic field, and to invite communications according to at least one NFC type near-field communication and one IBC (Intra-Body Communication) type near-field communication, wherein the device comprises:

a processor and a non-transitory computer readable medium comprising instructions stored thereon which when executed by the processor configure the device to implement the following on the reader terminal:

transmitting an invitation message inviting communications alternately according to types of near-field communication to a mobile terminal; and receiving, in response to said invitation message indicating an IBC communication and the mobile terminal being in IBC mode, a pairing message over a return channel distinct from the near-field channel.

13. A non-transitory computer readable medium comprising a computer program stored thereon and able to be implemented on a mobile terminal, the program comprising code instructions which, when the program is executed by a processor of the mobile terminal, carries out a method for adapting a communication of the mobile terminal, wherein the mobile terminal is equipped with an NFC (near-field communication) module, said mobile terminal being able to be set to an NFC mode or to an IBC (Intra-Body Communication) mode in order to carry out contactless transactions, and to receive a message in an electromagnetic field over a near-field channel, the method comprising:

receiving, from a reader terminal, an invitation message inviting communications alternately according to types of near-field communication;

and transmitting, in response to said invitation message indicating an IBC communication, and the mobile terminal being set to IBC mode, a pairing request over a return channel distinct from the near-field channel.

14. A non-transitory computer readable medium comprising a computer program stored thereon and able to be implemented on a reader terminal, the program comprising code instructions which, when the program is executed by a processor of the reader terminal, carries out a method for inviting communications on the reader terminal, of an NFC (near-field communication) type, said reader terminal being adapted to invite according to at least one NFC type near-field communication and one IBC (Intra-Body Communication) type near-field communication, the method comprising, on the reader terminal set to NFC reader mode so as to transmit a message in an electromagnetic field:

transmitting, to a mobile terminal, an invitation message inviting communications alternately according to types of near-field communication; and receiving, in response to said invitation message indicating an IBC communication and the mobile terminal being in IBC mode, a pairing message over a return channel distinct from the near-field channel.

* * * * *